United States Patent Office 3,726,847
Patented Apr. 10, 1973

3,726,847
POLYMERIZATION METHOD EMPLOYING
t-ALKYL PERESTERS OF t-HYDROPEROXIDES
Roger N. Lewis, Pinole, and Ronald L. Friedman, San Rafael, Calif., assignors to Argus Chemical Corporation, Brooklyn, N.Y.
No Drawing. Continuation-in-part of application Ser. No. 725,931, May 1, 1968. This application June 28, 1971, Ser. No. 157,683
Int. Cl. C08f *3/04, 3/30, 3/56*
U.S. Cl. 260—92.8 R                        25 Claims

ABSTRACT OF THE DISCLOSURE

Tertiary alkyl peresters of tertiary hydroperoxides are used as polymerization initiators wherein the peresters are characterized by the tertiary alkyl group of the acid moiety having at least two alkyl groups of 2 or more carbon atoms. Typical is the polymerization of certain vinyl monomers such as vinyl chloride.

---

This is a continuation-in-part of copending patent application Ser. No. 725,931, filed May 1, 1968, now U.S. Pat. No. 3,624,123.

This invention relates to polymerization using organic peroxide initiators. More particularly it relates to certain t-alkyl peresters of t-hydroperoxides and their use in the polymerization of monomers such as vinyl chloride.

Most of the reported work with peresters of the type in which both the acid (or acid halide, the form of the reactant commonly employed) and hydroperoxide used in the perester synthesis have the tertiary configuration has employed the simplest of the tertiary acids—namely pivalic acid having the structure:

$$\text{CH}_3\text{—}\underset{\underset{\text{CH}_3}{|}}{\overset{\overset{\text{CH}_3}{|}}{\text{C}}}\text{—}\overset{\text{O}}{\overset{\|}{\text{C}}}\text{—OH}$$

Recently peresters derived from acids in which one of the above methyl groups is replaced by a higher alkyl group have been disclosed.

It has now been discovered that when the tertiary or alpha carbon atom to the carbonyl group of the acid has not more than one methyl group and preferably no methyl groups bonded thereto, the perester derived from the esterification of such an acid with a tertiary hydroperoxide is an unexpectedly efficient initiator for polymerization reactions. Describing the peresters used in the present process for another viewpoint, the acid used in the esterification may have one methyl group attached to the alpha carbon atom provided the other two of the three groups on the alpha carbon atom are ethyl or larger alkyl groups. Preferably all of the groups attached to the alpha carbon atom of the acid moiety of the perester are ethyl or larger alkyl groups. Particularly outstanding results are obtained where such peresters are used for initiating the polymerization of styrene, vinyl chloride, vinyl acetate, and ethylene.

The peresters employed in the method of this invention, prepared by esterifying an acid anhydride or acid halide of the above type with a suitable tertiary hydroperoxide such as tertiary butyl hydroperoxide, have been found to have significantly shorter half-lives than the corresponding perester formed with pivaloyl chloride and the same hydroperoxide. Of important commercial significance, the present process provides higher yields of polymer and these higher yields are obtained with shorter polymerization times.

Briefly, the present method comprises polymerizing a monomer mass containing a monomer selected from styrene, vinyl chloride, vinyl acetate, and ethylene in which the polymerization is initiated with a preselected amount of a perester having the general formula:

$$\begin{array}{c}
R_1 \\
| \\
R_2\text{—C—R} \\
| \\
O \\
| \\
O \\
| \\
C=O \\
| \\
R_3\text{—C—R}_5 \\
| \\
R_4
\end{array}$$

wherein $R_1$ and $R_2$ are alkyl, phenyl, or participate in cyclohexyl groups where shown in broken lines, $R_3$, $R_4$, and $R_5$ are alkyl provided not more than one of $R_3$, $R_4$, and $R_5$ is methyl, and R is selected from the group consisting of alkyl, alkynyl, phenyl, cyclohexyl, and $$-(CH_2)_l-(C\equiv C)_m-(CH_2)_n-(C\equiv C)_o-(CH_2)_p-\underset{\underset{R_4'}{|}}{\overset{\overset{R_1'}{|}}{R}}-R_2'$$
$$\begin{array}{c}
| \\
O \\
| \\
O \\
| \\
C=O \\
| \\
R_3'-C-R_5' \\
| \\
R_4'
\end{array}$$

in which $l$, $m$, $n$, $o$, and $p$ are integers from 0–5 provided the sum of $l$, $m$, $n$, $o$, and $p$ is at least 1, and $R_1'$, $R_2'$, $R_3'$, $R_4'$, and $R_5'$ are each the same as $R_1$, $R_2$, $R_3$, $R_4$, and $R_5$, respectively, said peroxide having up to 50 carbon atoms, and further provided that when R is alkyl, alkynyl, phenyl or cyclohexyl, each of R, $R_1$ and $R_2$ have up to about 7 carbon atoms and each of $R_3$, $R_4$ and $R_5$ have up to about 8 carbon atoms, each of $R_1'$ and $R_2'$ have up to about 7 carbon atoms and each of $R_3'$, $R_4'$, and $R_5'$ have up to about 8 carbon atoms.

A preferred group of peresters for use in the process is obtained where R is an alkyl, cyclohexyl, phenyl, or alkynyl group so that a monoperester is provided. A typical example within this category is the case where R, $R_1$ and $R_2$ are all methyl groups. Such peresters are derived by the esterification of tertiary butyl hydroperoxide in accordance with the following general reaction:

$$R_4\text{—}\underset{\underset{R_5}{|}}{\overset{\overset{R_3}{|}}{C}}\text{—}\overset{O}{\overset{\|}{C}}\text{—Cl} + CH_3\text{—}\underset{\underset{CH_3}{|}}{\overset{\overset{CH_3}{|}}{C}}\text{—OOH} + \text{NaOH} \longrightarrow$$

$$R_4\text{—}\underset{\underset{R_5}{|}}{\overset{\overset{R_3}{|}}{C}}\text{—}\overset{O}{\overset{\|}{C}}\text{—OO—}\underset{\underset{CH_3}{|}}{\overset{\overset{CH_3}{|}}{C}}\text{—CH}_3 + \text{NaCl} + H_2O$$

Particularly useful peresters in the present process are obtained where the hydroperoxide used in the reaction is 1,1,3,3-tetramethylbutyl hydroperoxide.

The same reaction is involved where R is an alkynyl, phenyl, or cyclohexyl group and $R_1$ and $R_2$ have the above definitions. A perester in which R is alkynyl would be obtained for example where the following hydroperoxide is used instead of the tertiary butyl hydroperoxide shown:

$$CH\equiv C\text{—}\underset{\underset{CH_3}{|}}{\overset{\overset{CH_3}{|}}{C}}\text{—OOH}$$

Equally useful hydroperoxides include:

(1) 1-ethynyl-1-hydroperoxy cyclohexane
(2) 3-methyl-3-hydroperoxy butyne-1
(3) 3-methyl-3-hydroperoxy pentyne-1
(4) 3,5-dimethyl-3-hydroperoxy hexyne-1
(5) 3-phenyl-3-hydroxy butyne-1
(6) 5-methyl-3-ethyl-3-hydroperoxy heptyne-1
(7) 3-methyl-3-hydroperoxy decyne-1
(8) 3,6-dimethyl-3-hydroperoxy-heptyne-1
(9) 3,5-dimethyl-3-hydroperoxy hexyne-1
(10) 3,4-dimethyl-3-hydroperoxy pentyne-1
(11) 3-methyl-3-hydroperoxy nonyne-1

All of the above may be used as saturated hydroperoxides if the acetylenic site is hydrogenated in the usual fashion.

The foregoing examples are typical of the possible cyclohexyl groups which may occur at R as well as $R_1$ and $R_2$. In general, any alkyl, alkynyl, phenyl, or cyclohexyl group desired is contemplated for R, $R_1$, $R_2$ in which any rings present may contain alkyl substituents. In addition, all of these groups may contain other non-interfering substituents such as halogen atoms as desired. For practical purposes the reactants will generally be selected so that the total perester molecule obtained contains not more than about 50 carbon atoms so that the active oxygen content of the composition will not be too low for commercial purposes.

Instead of a monohydroperoxide, dihydroperoxides are contemplated whereby a diperester is obtained as the end product. In this case R in the above general formula is the group:

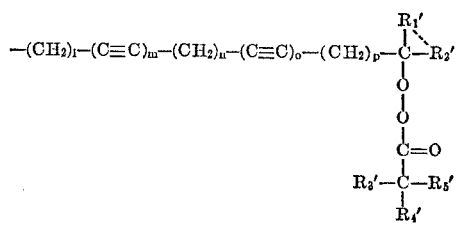

Typical dihydroperoxides which can be used are:

(1) 2,5-dimethyl-2,5-dihydroperoxy hexyne-3
(2) 2,7-dimethyl-2,7-dihydroperoxy octyne-4
(3) 3,4,7,8-tetramethyl-4,7-dihydroperoxy decyne-5
(4) 4,7-dimethyl-4,7-dihydroperoxy decyne-5
(5) 3,6-diethyl-3,6-dihydroperoxy octyne-4
(6) 3,4-dimethyl-3,4-dihydroperoxy pentyne-1

Where a dihydroperoxide is used as a starting reactant in the esterification reaction given previously, twice the amount of acid halide is used for esterifying the two available sites. A preferred saturated dihydroperoxide for use in this invention is 2,5-dimethyl-2,5-dihydroperoxy-hexane. Additional saturated dihydroperoxides useful in this esterification reaction for preparing the present compounds are described in the preparation of diperesters in U.S. Pat. No. 3,264,274.

The selected tertiary hydroperoxide is reacted with any alkanoic acid halide (anhydride) providing the alpha carbon atom to the carbonyl group of the acid halide is tertiary and contains not more than one methyl group. These acid halides are derived from acids commonly referred to as "neo"-acids which term implies that the alpha carbon atom of the acid is fully substituted with alkyl groups. A series of typical neo-acids useful in this invention will be illustrated hereinafter. In the preferred embodiment, all of the acids contain alkyl groups although non-interfering substituents could be present on the alkyl groups. As used herein the term "alkyl" should be construed in the broadest sense to include hydrocarbon groups as well as substituted alkyl groups.

A series of examples are described below to illustrate the invention. Some of the examples such as Table III, make use of the neo-acid mixtures listed in the following table in preparing the peresters used in the method. As will be seen from the table, the acids employed are a mixture of isomers (except the pivalic acid used as a control for comparison) including some molecules having two methyl groups on the alpha carbon atom. These mixtures were used because they were the only commercially available neo-acids. If available, it is preferred to use only those neo-acid isomers having the configuration required by the present method. In all cases the end product perester mixture obtained from the acid mixtures shown in Table I has the desired advantageous properties by virtue of the presence of some perester content having at least two groups on the acid alpha carbon atom having two or more carbon atoms. For example, the perester mixture obtained from the neodecanoic acid mixture of Table I

TABLE I

| Neo-acid | Total number carbon atoms | Supplier | Isomer distribution, percent weight [1] | | |
|---|---|---|---|---|---|
| | | | α-di-methyl | α-Methyl-alkyl [3] | α-Dialkyl [4] |
| 1. Pivalic | 5 | Shell Chemical Company | 99+ | | |
| 2. Neoheptanoic | 7 | Enjay Chemical Company | 95 | ([5]) | |
| 3. Neooctanoic | 8 | do | 39 | 61 | [1] |
| 4. Neononanoic | 9 | Shell Chemical Company | 56 | 27 | |
| 5. Neodecanoic [2] | 10 | Enjay Chemical Company | 25±5 | 60±10 | 15±10 |
| 6. Neotridecanoic | 13 | do | 25±5 | 60±10 | 15±10 |

[1] Information taken from supplier data sheets.
[2] A recent publication, M. Fefer and A. J. Rutkowski, J. Amer. Oil Chem. Soc., 45, 5 (1968) gives the isomer distribution of this neo-decanoic acid as: α-dimethyl 31±5; α-methyl-alkyl 67±10; α-dialkyl 2±10.
[3] One methyl group plus one larger alkyl group.
[4] Two alkyl groups larger than the methyl group.
[5] 5(methyl-ethyl).

provides the improvements of the present method because the perester product contains approximately 75% weight of the desired isomers.

In order to prepare the peresters used in this invention, it is advantageous to first convert the selected neo-acid to an acid halide. A typical experimental procedure for this purpose is as follows:

EXAMPLE I

Neodecanoyl chloride

The reaction is run in a 1-neck round-bottom flask equipped with a J-tube having a thermometer and a condenser with a drying tube. Stirring is done with a magnetic stirring bar.

75.0 g. of $PCl_3$ (0.55 mole, equal to 25 mole percent excess) is added quickly from a separatory funnel through the condenser to 225.3 g. (1.31 moles) of Enjay neo-decanoic acid being stirred at 20° C. The mixture is warmed to 65° C. in about 20 minutes and maintained at this temperature for 2½ hours. Then the heating and stirring are stopped, and the mixture is allowed to cool to room temperature. After separation from the phosphorous acid layer, the acid chloride is stripped under 20–75 mm. pressure at about 50° C. The finished acid chloride weighed 249.2 g. (249.8 g. theoretical for 100% conversion and purity) and can be used without further purification.

This example illustrates a reaction procedure which can be used to prepare acid chlorides from all of the neo-acids shown in Table I as well as from the single isomer neo-acids referred to later, with the only modification being that the stripping may be done at a lower temperature depending upon the boiling point of the acid chloride.

Using any desired neo-acid halide having the requisite structure referred to above, the following peresters are typical of those which may be used in the invention. In the formulas, the structure of $R_3$, $R_4$ and $R_5$ will depend upon the neo-acid halide selected and have the definitions previously given.

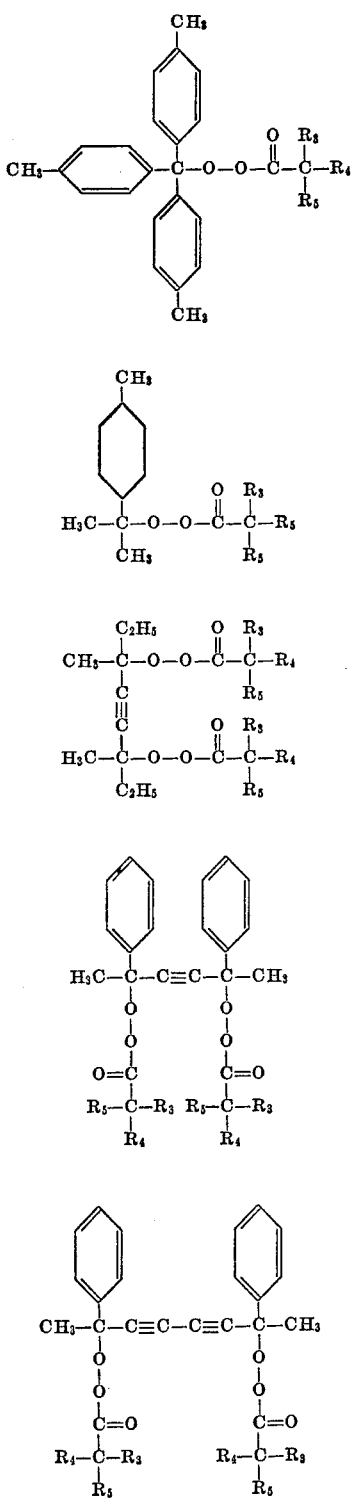

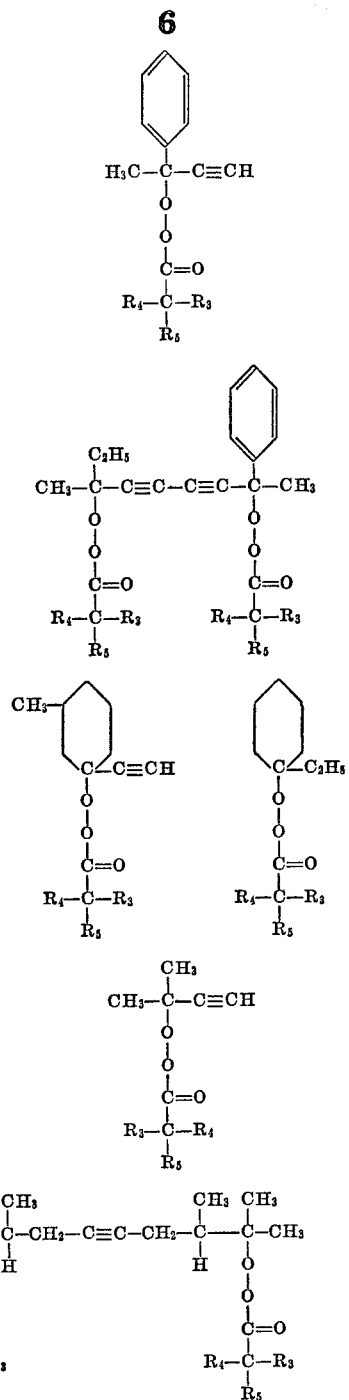

To further illustrate the invention, a series of tertiary butyl peresters were prepared from the acid halides of each of the neo-acids of Table I. The following procedure is typical of the process used for perester formation.

EXAMPLE II t-Butyl peroxyneoheptanoate

To a stirred mixture of 34 ml. water, 16 ml. of tertiary butyl alcohol (TBA), and 15.29 g. (0.191 mole) of 50% NaOH, 9.14 g. (0.099 mole) of 97.55% tertiary-butyl hydroperoxide (TBHP) was added slowly in 2 minutes at 20–25° C. Then 19.11 g. (0.1286 mole) of vacuum-stripped neoheptanoyl chloride was added dropwise to the vigorously stirred reaction mixture in 20 minutes at 20–25° C. The reaction mixture was warmed to 50° C. in about 15 minutes and held at 50° C. for 30 minutes. Then about 100 ml. ice $H_2O$, 0.5 g. NaCl, and 25 ml. ether were added to the reaction mixture; it is stirred about 1–2 minutes and allowed to phase separate. The organic layer is washed two times with 40 ml. of cold 1-2% aqueous KOH solution and two times with 40 ml. of cold tap water containing a little NaCl. Then the organic layer is dried with anhydrous $Na_2SO_4$, filtered through a layer of anhydrous $MgSO_4$, and concentrated under vacuum using a 10° C. water bath. Product A.O. analysis: Theory, 7.91; found, 7.67, 97.03% pure; 76.1% yield.

All of the other peresters are formed by substantially the same procedure by substituting the appropriate acid halide for the neoheptanoyl chloride of this example. Similarly, where the perester desired is derived from a hydroperoxide other than t-butyl hydroperoxide, the appropriate hydroperoxide is substituted therefore in the above procedure. For example, 1,1,3,3-tetramethylbutyl hydroperoxide can be substituted for the t-butyl hydroperoxide to obtain corresponding peresters.

As already mentioned, the peresters used in this invention have significantly shorter half-lives than the related peresters previously described in the literature. In general, shorter half-lives mean faster reaction times and this is of value from a commercial standpoint. Some typical half-life data of peresters used in this invention as compared with the previously known pivalic perester is provided in the following table:

TABLE II

| Initiator | Temperature, ° C. | | | |
|---|---|---|---|---|
| | 40 | 50 | 60 | 70 |
| 1. t-Butyl peroxypivalate | 84 | 19.9 | | 1.6 |
| 2. t-Butyl peroxyneoctanoate | | 8.4 | 2.3 | 0.67 |
| 3. t-Butyl peroxyneodecanoate | | 8.0 | 2.3 | 0.72 |

Example II is concerned with the synthesis of monoperesters used in this invention. The following Examples III, IV, and V illustrate the preparation of typical diperesters for use in this invention.

EXAMPLE III 2,7-dimethyl octane-2,7-diperneodecanoate

To a stirred mixture of 50 ml. water, 5 drops of Triton X-100 emulsifier, and 16.0 g. (0.200 mole) of 50% NaOH, 7.8 g. (0.0366 mole) of 96.7% 2,7-dimethyl-2,7-dihydroperoxy octane was added while maintaining the temperature at about 25° C. The reaction mixture was then warmed to 40° C., and 24.7 g. (0.130 mole) of neo-decanoyl chloride was added to the vigorously stirred reaction mixture in 5 minutes at 40° C. The reaction mixture is held at 40° C. for an additional 3½ hours. Then the product is isolated in the same manner as described in Example II, except n-hexane was used, rather than ether. Product A.O. analysis: Theory, 6.22; found, 6.22, 100.0% pure; 65.1% yield.

EXAMPLE IV 2,5-dimethyl hexane-2,5-diperneononanoate

To a stirred mixture of 13 ml. water, 50 ml. TBA, 10 drops Triton X-100 emulsifier, and 12.5 g. (0.156 mole) 50% NaOH, 5.7 g. (0.03 mole) of 94.3% 2,5-dimethyl - 2,5 - dihydroperoxy hexane was added while maintaining the temperature at about 24° C. Then 18.6 g. (0.105 mole) of neononanoyl chloride is added dropwise to the vigorously stirred reaction mixture in 22 minutes at 27° C. The reaction mixture is warmed to 50° C. in 7 minutes and maintained at 50° C. for 53 minutes. Then the product is isolated in the same manner as described in Example II, except petroleum naphtha was used, rather than ether. Product A.O analysis: Theory, 6.98; found, 6.41, 91.8% pure; 67.4% yield.

EXAMPLE V 2,5-dimethyl hexane-2,5-diperneoheptanoate

To a stirred mixture of 500 ml. water, 75 drops of Triton X-100 emulsifier, and 590.0 g. (7.37 moles) of 50% NaOH, 156.7 g. of 94.3% 2,5-dimethyl-2,5-dihydroperoxy hexane was added at 14° C. The reaction mixture was cooled to 0° C. Then 443.3 g. (2.50 moles) of neoheptanoyl chloride was added to the vigorously stirred reaction mixture in 34 minutes while maintaining the temperature at 0.5° C. Then the reaction was allowed to warm to 19° C. in 47 minutes and maintained between 19-22° C. for an additional 95 minutes. Then the product is isolated in the same manner as described in Example II, except petroleum naphtha was used, rather than ether. Product A.O. analysis: Theory, 7.95; found, 7.38, 92.8% pure; 62.2% yield.

The peresters employed in this invention are most advantageously used for the polymerization of styrene, vinyl chloride, vinyl acetate, and ethylene. Typical of the benefits from using the specified type of peresters is illustrated by the polymerization of vinyl chloride. The peroxides listed in Table III below were prepared by the methods just described from the neo-acids of Table I (purity and yield are given in Table III) and were used to initiate the polymerization of vinyl chloride to make polyvinyl chloride (PVC).

TABLE III

| Peroxide | Synthesis results, percent | | Utility as an initiatory for vinyl chloride | | |
|---|---|---|---|---|---|
| | | | Average PCV yield, g. | | |
| | Purity | Yield | With equal wt. initiator | With equal moles initiator | Average PVC yield, percent |
| 1. t-Butyl peroxypivalate | 95.75 | 68.8 | 7.3 | | 14.6 |
| 2. t-Butyl peroxyneoheptanoate: | | | | | |
| a. | | | 13.45 | | 26.9 |
| b. | | | | 15.55 | 31.1 |
| 3. t-Butyl peroxyneooctanoate: | | | | | |
| a. | 89.12 | 56.8 | 16.7 | | 33.4 |
| b. | | | | 18.75 | 37.5 |
| 4. t-Butyl peroxyneononanoate: | | | | | |
| a. | 90.82 | 46.8 | 14.9 | | 29.8 |
| b. | | | | 19.5 | 39.0 |
| 5. t-Butyl peroxyneodecanoate: | | | | | |
| a. | 90.84 | 68.1 | 17.5 | | 35.0 |
| b. | | | | 21.9 | 43.8 |
| 6. t-Butyl peroxyneotridecanoate: | | | | | |
| a. | 83.72 | 58.2 | 15.0 | | 30.0 |
| b. | | | | 23.4 | 46.8 |
| 7. 2,5-dimethylhexane-2,5-diperoxypivalate | 100.00 | 73.0 | 7.65 | | 15.3 |
| 8. 2,5-dimethylhexane-2,5-diperoxyneodecanoate: | | | | | |
| a. | 87.26 | 77.5 | 16.3 | | 32.6 |
| b. | | | | 22.1 | 44.2 |

Comparisons were made between the monoperesters of this invention and t-butyl peroxypivalate on both an equal weight and equal molar basis when used for the polymerization of vinyl chloride. Similarly, a typical diperester of this invention was compared with a corresponding diperoxypivalate on both an equal weight and equal molar basis. In the case of the monoperesters the peroxide was added to the vinyl chloride monomer to comprise 0.03% by weight or $8.61 \times 10^{-5}$ moles thereof. In the case of the diperesters, additions to the monomer were made to comprise 0.03% by weight or $4.329 \times 10^{-5}$ moles thereof.

The polymerization procedure used is as follows: Into a 6½ fluid ounce Coke bottle, containing 94.0 g. of frozen dispersing solution, were added the appropriate amount of peroxide and 50.0 g. of vinyl chloride monomer. The Coke bottle was capped, the contents almost melted, and then the bottle is placed in a rotating constant temperaure bath for 6 hours at 50±2° C. After the bottle was cooled, and the excess monomer vented, the PVC was filtered, washed, and dried at 40–50° C. for 12–16 hours. The results are shown in Table III.

With respect to the results shown in Table III, it is to be noted that the mixtures containing at least some monoperesters suitable for use in this invention, i.e. those having an acid tertiary carbon atom having not more than one methyl group attached thereto, are substantially more efficient in terms of polymer yield than the control peroxypivalate perester. Similarly, the diperester of this invention is more efficient than the control pivalate diperester.

In addition to efficiency in terms of increased yield, the peresters used in this invention provide an additional advantage in speed of polymer formation. Using peroxide initiators to comprise 0.05% by weight of vinyl chloride monomer, the same procedure used in obtaining the data shown in Table III was again employed with the peresters shown in Table IV below. The percent yield of polyvinyl chloride polymer was monitored with respect to time. The results are as follows:

TABLE IV.—YIELD OF PVC VERSUS TIME, 0.05% WT. INITIATOR AT 50±2° C.

| Time, hours | Percent wt. PVC yield | | | | | |
|---|---|---|---|---|---|---|
| | 2 | 4 | 6 | 8 | 10 | 12 |
| Initiator: | | | | | | |
| 1. t-Butyl peroxypivalate | 5.8 | 15.8 | 28.2 | 43.3 | 59.4 | 76.0 |
| 2. Butyl peroxyneooctanoate | 13.0 | 34.8 | 60.8 | 81.2 | 86.0 | 87.8 |
| 3. t-Butyl peroxyneodecanoate | 11.4 | 29.8 | 50.6 | 72.4 | 83.0 | 86.0 |

The foregoing experimental data was obtained with t-butyl peresters of appropriate acids. The t-butyl group was selected because of the widely used and commercially available t-butyl hydroperoxide used in the preparation of the peresters. However, equivalent results are obtained with the other types of peresters of this invention formed with hydroperoxides other than t-butyl hydroperoxide. To illustrate the scope of the invention contemplated, α-cumyl peroxyneodecanoate was selected to typify the use of aryl hydroperoxides in making the peresters. 1,1'-dicyclohexyl acetylene-1,1'-diperoxyneodecanoate illustrates the presence of acetylenic and cycloalkyl groups in the hydroperoxide. The following work provides details of the synthesis of these peresters and the advantages in use as polymerization initiators. Again, the corresponding pivalate perester is used for comparison.

EXAMPLE VI 1,1'-dicyclohexyl acetylene-1,1'-diperoxypivalate

To a stirred mixture of 18½ ml. water, 18 ml. t-butyl alcohol, and 9.67 g. (0.1209 mole) of 50% NaOH, 6.55 g. (0.0237 mole) of 92.0% 1,1'-dicyclohexyl-1,1'-dihydroperoxy acetylene was added at 20° C. in 8 minutes to form a thick slurry. Then 8.58 g. (0.0711 mole) of pivaloyl chloride was added to the vigorously stirred reaction mixture in 10½ minutes at 20–28° C. The reaction mixture is warmed to 50° C. in about 15 minutes and held at 50° C. for 30 minutes. Again, the product is isolated in the same manner as described in Example II, except isohexane was used, rather than ether. Product A.O. analysis: Theory, 7.57; found, 6.49, 85.8% pure; 50.5% yield.

EXAMPLE VII 1,1'-dicyclohexyl acetylene-1,1'-diperoxyneodecanoate

Following the procedure of Example VI but substituting neodecanoyl chloride for the pivaloyl chloride therein, 1,1'-dicyclohexyl acetylene-1,1'-diperoxyneodecanoate was obtained in a yield of 64.8% and a purity of 72.9%. The general formula of this perester is:

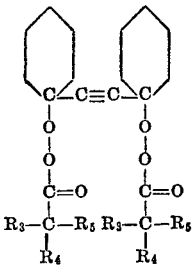

EXAMPLE VIII

α-Cumyl peroxypivalate and α-cumyl peroxyneodecanoate

Peresters of the general formula:

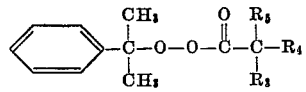

were prepared in accordance with the process described in Example II by reacting cumene hydroperoxide with pivaloyl chloride to form α-cumyl peroxypivalate in a yield of 76.1% and a purity of 86.5%. Similarly, cumene hydroperoxide and neodecanoyl chloride were reacted to form α-cumyl peroxyneodecanoate in a yield of 71.6% and a purity of 81.6%.

The peresters of Examples VI, VII and VIII together with t-butyl peroxypivalate were used as initiators for the polymerization of vinyl chloride monomer. The results are shown in Table V below.

The data in Table V was obtained by employing all the pivalate and the neodecanoate peresters on an equal weight concentration with respect to the monomer of 0.03% by weight. Comparison was also made on an equal mole basis using $6.35 \times 10^{-5}$ moles of the α-cumyl peresters (equal to 0.03% wt. of α-cumyl peroxypivalate) and using $3.55 \times 10^{-5}$ moles of the 1,1'-dicyclohexyl acetylene peresters (equal to 0.03% by weight of 1,1'-dicyclohexyl acetylene-1,1'-diperoxypivalate). Polymerization conditions were 6 hours at about 52° C. using the same general procedure described in connection with Table III. The higher yields obtained with t-butyl peroxypivalate in Table V are due to the use of a higher polymerization temperature than before. The results shown in Table V again illustrate the unexpected advantages obtained with the peresters of this invention.

TABLE V

| Peroxide | Utility as an initiator for vinyl chloride | | |
|---|---|---|---|
| | Average PVC yield, g. | | Average PVC yield, percent |
| | With equal wt. initiator | With equal moles initiator | |
| 1. t-Butyl peroxypivalate | 11.3 | | 22.6 |
| 2. α-cumyl peroxypivalate | 18.75 | | 37.5 |
| 3. α-Cumyl peroxyneodecanoate: | | | |
| a. | 21.25 | | 42.5 |
| b. | | 37.1 | 74.2 |
| 4. 1,1'-dicyclohexyl acetylene-1,1'-diperoxypivalate | 16.25 | | 32.5 |
| 5. 1,1'-dicyclohexyl acetylene-1,1'-diperoxyneodecanoate: | | | |
| a. | 14.65 | | 29.3 |
| b. | | 17.35 | 34.7 |

EXAMPLE IX

This example will further illustrate the importance of employing peresters in the present process which are derived from neo-acids having not more than one and preferably no methyl groups on the alpha carbon atom of the neo-acid.

Substantially pure 2,2-dimethyl valeric acid and 2-methyl-2-ethyl hexanoic acid were converted to the acid chloride in accordance with Example I of the instant specification. In addition substantially pure 2,2-diethyl butyroyl chloride was obtained. The three acid chlorides were then esterified with tertiary butyl hydroperoxide in accordance with Example II of the instant specification. The three tertiary butyl peroxy esters thus obtained were then used for the production of polyvinyl chloride in accordance with the procedure previously described. The same equal molar amounts of the three peroxy esters were used with the vinyl chloride monomer. The yields of PVC obtained are shown in the following table:

| Peroxide | Average PVC yield | |
|---|---|---|
| | Grams | Percent |
| 1. t-Butyl peroxy-2,2'-dimethyl valerate | 15.06 | 30.1 |
| 2. t-Butyl peroxy-2-methyl-2-ethyl hexoate | 17.90 | 35.8 |
| 3. t-Butyl peroxy-2,2-diethyl butyrate | 29.46 | 58.9 |

Peroxide #1 in the above table represents the prior art in which the alpha carbon atom contributed by the acid contains dimethyl substitution. Compound #2 is representative of the presently claimed invention in which the alpha carbon atom contains only one methyl group and one alkyl group larger than a methyl group, e.g. an ethyl group. Peroxide #3 of the above table represents the preferred embodiment of this invention in which the alpha carbon atom contains no methyl groups. The alpha carbon atom is diethyl substituted. The relationship of the three molecules may be most clearly seen by reference to the following structural formulas:

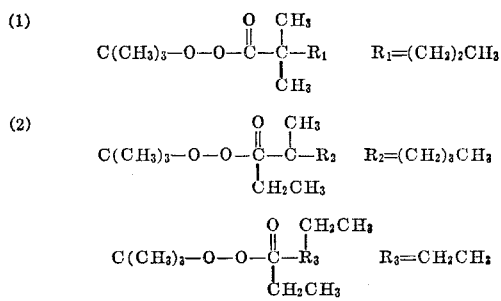

Calculating from the above table of PVC yield results, compound #2 provides an increase in PVC yield of 18.9% over the results obtained from the prior art compound #1. Compound #3 provides an increase in PVC yield of 95.7% relative to the PVC yield obtained from the use of prior art compound #1.

EXAMPLE X

This example illustrates the superior performance obtained by the use of peresters of 1,1,3,3-tetramethylbutyl hydroperoxide. The four peroxides shown in the table below were prepared in accordance with the procedures previously described herein. The peroxides obtained were then used in the production of PVC in accordance with the procedure previously described and used in the preceding example. Peroxide numbers 1, 2 and 4 shown in the tabulation of the results below represents single isomeric forms of the perester indicated and were obtained by reacting the hydroperoxide with the single acid chloride isomer. The neodecanoate peroxide #3 is an isomeric mixture obtained by reaction of the hydroperoxide with the halide of the neodecanoic acid mixture shown in Table I. The results are as follows:

| Peroxide | Average PVC Yield | |
|---|---|---|
| | Grams | Percent |
| 1. 1,1,3,3-tetramethylbutylperpivalate | 10.66 | 21.3 |
| 2. 1,1,3,3-tetramethylbutyl per 2,2-dimethyl valorate | 27.16 | 54.3 |
| 3. 1,1,3,3-tetramethylbutyl per neodecanoate | 32.12 | 64.2 |
| 4. 1,1,3,3-tetramethylbutyl per 2,2-diethyl butyrate | 38.32 | 76.6 |

The pivalate perester, peroxide #1, is specifically disclosed in U.S. Pat. No. 3,446,831, and has been included for comparison. Peroxide #2 also represents the prior art since the alpha carbon atom contributed by the neo-acid contains dimethyl substitution. Peroxide #3 is illustrative of this invention since approximately 75% of the peresters in the isomeric mixture contain not more than one methyl group on the alpha carbon atom contributed by the acid. Peroxide #4 represents the preferred embodiment of this invention since the acid alpha carbon atom contains no methyl groups. From the results, the superiority of the use of peresters in accordance with this invention is clear.

In addition, peroxide numbers 3 and 4 represent new compositions of matter not disclosed in the prior art. Accordingly, tertiary alkyl peresters of 1,1,3,3-tetramethylbutyl hydroperoxide in which not more than one group on the tertiary alpha carbon atom of the acid portion of the molecule is a methyl group and preferably where no methyl groups are present on said carbon atom represents a new and surprisingly effective organic peroxide polymerization initiator. The unexpected properties of this group of new compositions of matter is most rapidly appreciated by comparing the neodecanoate peroxide #3 of this example with the performance of the tertiary butyl peroxyneodecanoate of Table III. The neodecanoate derivative of 1,1,3,3-tetramethylbutyl hydroperoxide provides an almost 50% improvement in yield of PVC as compared with the neodecanoate derivative of tertiary butyl hydroperoxide. Accordingly the new compositions provided by this invention may be defined by the following general formula:

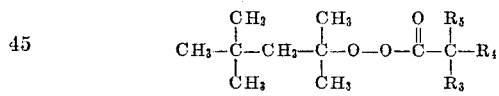

wherein each of $R_5$, $R_4$ and $R_3$ is the same or different alkyl groups having from 1 to about 10 carbon atoms provided that not more than one of $R_5$, $R_4$ and $R_3$ is a methyl group and preferably where none of $R_5$, $R_4$ and $R_3$ is a methyl group.

Aside from the selection of the perester having the structure discussed above, the practice of the present method in polymerization of styrene, vinyl chloride, vinyl acetate, and ethylene is consistent with prior art procedures for initiating the polymerization of such monomers. Thus, the present peresters are added in amounts generally comparable to those previously used and will usually fall within the range of about .005% to 3% by weight of the monomer content and more commonly about .01–0.5% by weight of the monomer content. For practical purposes the minimum amount of the perester is added which will effectively initiate the polymerization of the monomer mass. The usual conditions of temperature, pressure, solvents, and the like used in the polymerization of these monomers may be employed. In addition, it is contemplated that co-catalysts may be included to initiate the polymerization. For example, diacyl peroxides such as lauroyl peroxide may be used in combination with the present peresters as is understood in the art.

What is claimed is:

1. In the polymerization of a monomer mass containing a monomer selected from the group consisting of styrene, vinyl chloride, vinyl acetate and ethylene, the improvement in which the polymerization of said monomer mass is initiated with tertiary alkyl perester of tertiary hydroperoxide comprising an initiating amount of at least one perester of the formula:

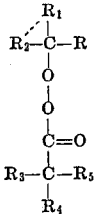

wherein $R_1$ and $R_2$ are alkyl, phenyl, or participate in a cyclohexyl group where shown in broken lines, $R_3$, $R_4$, and $R_5$ are alkyl provided not more than one of $R_3$, $R_4$, and $R_5$ is methyl, and R is selected from the group consisting of alkyl, alkynyl, phenyl, cyclohexyl, and

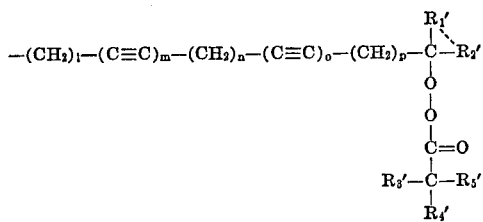

in which $l$, $m$, $n$, $o$, and $p$ are integers from 0–5 provided the sum of $l$, $m$, $n$, $o$, and $p$ is at least 1, and $R_1'$, $R_2'$, $R_3'$, $R_4'$, and $R_5'$ are each the same as $R_1$, $R_2$, $R_3$, $R_4$, and $R_5$, respectively, said peroxide having up to 50 carbon atoms, and further provided that when R is alkyl, alkynyl, phenyl or cyclohexyl, each of R, $R_1$ and $R_2$ have up to about 7 carbon atoms and each of $R_3$, $R_4$ and $R_5$ have up to about 8 carbon atoms, each of $R_1'$ and $R_2'$ have up to about 7 carbon atoms and each of $R_3'$, $R_4'$ and $R_5'$ have up to about 8 carbon atoms.

2. The polymerization method in accordance with claim 1 wherein $R_3$, $R_4$ and $R_5$ each have at least two carbon atoms.

3. The polymerization method in accordance with claim 1 wherein the sum of $m$ and $o$ is at least one.

4. The polymerization method in accordance with claim 1 wherein $R_1$ and $R_2$ are alkyl, phenyl, or participate in a cyclohexyl group where shown in broken lines and R is alkyl, alkynyl, phenyl or cyclohexyl.

5. The polymerization method in accordance with claim 1 wherein R is:

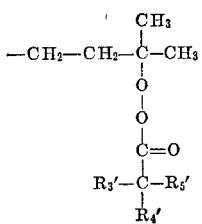

and wherein $R_1$ and $R_2$ are methyl groups.

6. The polymerization method in accordance with claim 1 wherein R is:

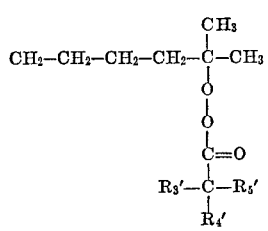

and wherein $R_1$ and $R_2$ are methyl groups.

7. The polymerization method in accordance with claim 1 wherein $R_1$ and $R_2$ are methyl groups and R is a phenyl group.

8. The polymerization method in accordance with claim 1 wherein said tertiary alkyl perester of tertiary hydroperoxide is an isomeric mixture.

9. The improved method in accordance with claim 1 wherein the monomer selected is vinyl chloride.

10. The polymerization method in accordance with claim 1 wherein the monomer selected is ethylene.

11. In the polymerization of a monomer mass containing a monomer selected from the group consisting of styrene, vinyl chloride, vinyl acetate and ethylene, the improvement in which the polymerization of said monomer mass is initiated with tertiary alkyl perester of tertiary hydroperoxide comprising an initiating amount of at least one perester of the formula:

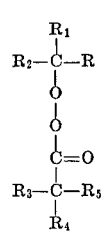

wherein each of R, $R_1$ and $R_2$ is alkyl having up to about 7 carbon atoms and each of $R_3$, $R_4$ and $R_5$ is alkyl having up to about 8 carbon atoms provided not more than one of $R_3$, $R_4$ and $R_5$ is methyl.

12. The polymerization method in accordance with claim 11 wherein $R_3$, $R_4$ and $R_5$ each have at least two carbon atoms.

13. The polymerization method in accordance with claim 11 wherein R, $R_1$ and $R_2$ are methyl groups.

14. The polymerization method in accordance with claim 13 wherein $R_3$, $R_4$ and $R_5$ together with the adjacent carbonyl group form a neoheptanoate group.

15. The polymerization method in accordance with claim 13 wherein $R_3$, $R_4$ and $R_5$ together with the adjacent carbonyl group form a neooctanoate group.

16. The polymerization method in accordance with claim 13 wherein $R_3$, $R_4$ and $R_5$ together with the adjacent carbonyl group form a neononanoate group.

17. The polymerization method in accordance with claim 13 wherein $R_3$, $R_4$ and $R_5$ together with the adjacent carbonyl group form a neodecanoate group.

18. The polymerization method in accordance with claim 13 wherein $R_3$, $R_4$ and $R_5$ together with the adjacent carbonyl group form a neotridecanoate group.

19. The polymerization method in accordance with claim 11 wherein said perester is t-butyl peroxy-2-methyl-2-ethyl hexoate.

20. The polymerization method in accordance with claim 11 wherein said perester is t-butyl peroxy-2,2-diethyl butyrate.

21. The polymerization method in accordance with claim 11 wherein R, $R_1$ and $R_2$ together with the associated tertiary carbon atom form a 1,1,3,3-tetramethylbutyl group.

22. The polymerization method in accordance with claim 11 wherein said tertiary alkyl perester of tertiary hydroperoxide is an isomeric mixture.

23. The polymerization method in accordance with claim 22 wherein said isomeric mixture comprises t-butyl peroxyneodecanoates in which the acid moiety is derived from neodecanoic acids, about 31% by weight of which are α-dimethyl substituted, about 67% by weight of which are α-methyl-α-higher alkyl substituted, and about 2% by weight of which are α-dialkyl (higher than methyl) substituted.

24. The polymerization method in accordance with claim 11 wherein the monomer selected is ethylene.

25. The polymerization method in accordance with claim 11 wherein the monomer selected is vinyl chloride.

References Cited
UNITED STATES PATENTS

| | | | |
|---|---|---|---|
| 2,497,323 | 2/1950 | Roedel | 260—DIG. 28 |
| 3,446,831 | 5/1969 | Mageli et al. | 260—85.5 F |

HARRY WONG, JR., Primary Examiner

U.S. Cl. X.R.

260—89.1, 93.5 R, 4.9 R, 453 R, 610 R